United States Patent [19]

Hollingsworth

[11] 4,098,873

[45] Jul. 4, 1978

[54] COUNTER-CURRENT PROCESS FOR PASSING A SOLID PARTICULATE REACTANT TO A LIQUID REACTANT

[75] Inventor: Clinton Allen Hollingsworth, Lakeland, Fla.

[73] Assignee: Borden, Inc., Columbus, Ohio

[21] Appl. No.: 605,307

[22] Filed: Aug. 18, 1975

[51] Int. Cl.² .......................... C01F 11/22; C02B 1/56; C02B 1/42; C01B 9/08

[52] U.S. Cl. .................................. 423/490; 423/489; 423/659; 210/37 R; 210/38 R; 23/252 R

[58] Field of Search ............... 423/490, 659 R, 659 F, 423/489; 210/37 R, 38 R, 34

[56] References Cited

U.S. PATENT DOCUMENTS

| | | | |
|---|---|---|---|
| 2,743,999 | 5/1956 | Binswanger | 423/201 |
| 3,357,788 | 12/1967 | Ross | 423/490 |

*Primary Examiner*—Edward Stern
*Attorney, Agent, or Firm*—George A. Kap; George P. Maskas; Daniel D. Mast

[57] ABSTRACT

A solid, particulate reactant is continuously added to a first zone and a liquid reactant is continuously added to a second zone. A conduit between the zones allows the solid and liquid reactants to pass counter-currently between the zones, the reaction being accomplished on contact between the reactants. During steady state operation, a clear layer is established in each zone above a slurry layer of the particles in solution. The clear layer is withdrawn from the top of each zone and introduced at the bottom thereof causing agitation in the slurry layer which promotes the reaction. The solid reactant is withdrawn from the second zone while the spent liquid reactant is withdrawn from the first zone.

13 Claims, 1 Drawing Figure

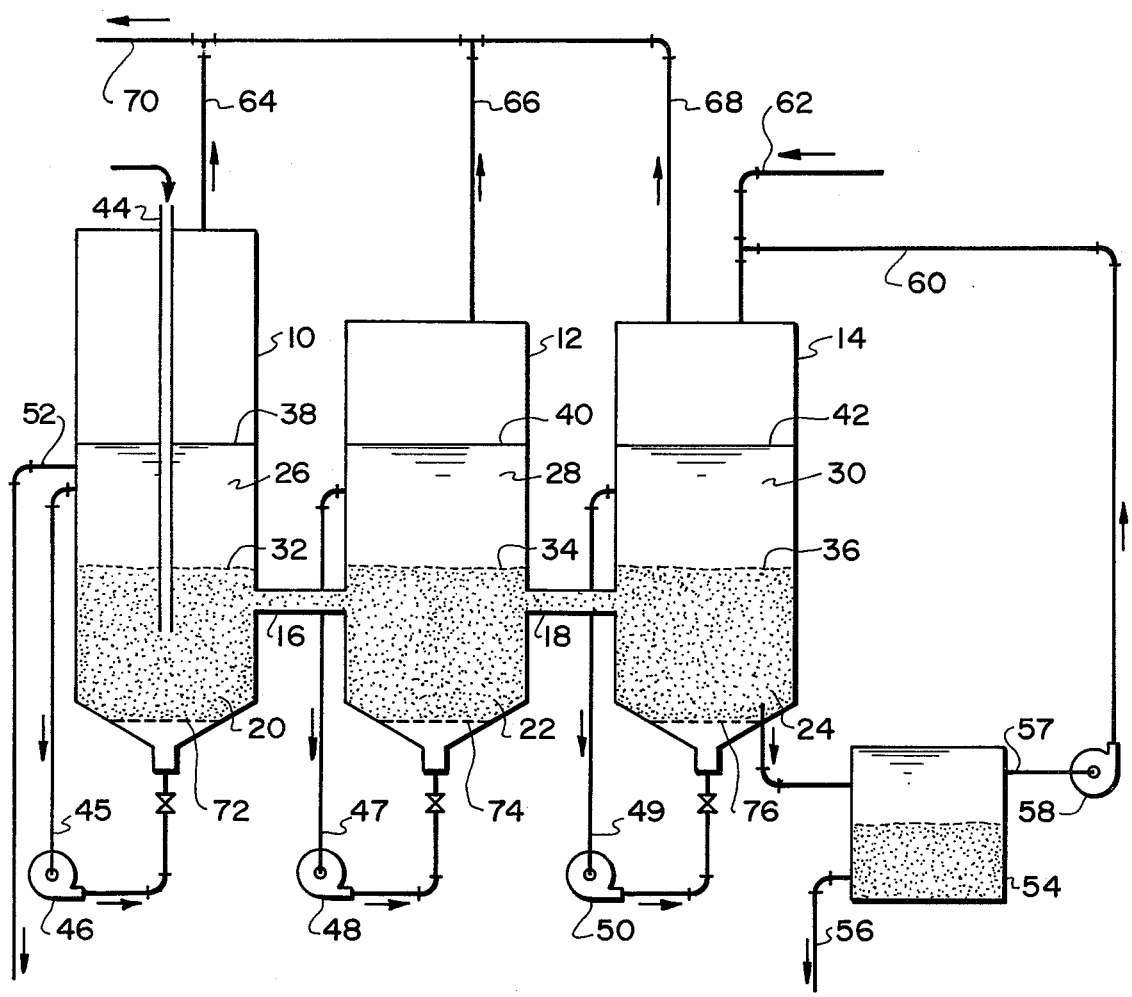

COUNTER-CURRENT PROCESS FOR PASSING A SOLID PARTICULATE REACTANT TO A LIQUID REACTANT

This invention relates to apparatus and process for reacting a particulate solid with a liquid to produce a solid product and a spent liquid depleted of one active substance. This is achieved by passing the solid reactant counter-currently to the liquid reactant. The process includes at least two vessels or reactors wherein the solid is added to the first vessel and the liquid is added to the second vessel with a connection between the vessels for passing the solid in one direction and the liquid in the opposite. The reaction takes place upon contact of the solid and liquid reactants.

A search has been conducted of the prior art relating to the subject matter herein which is available to the Patent Office upon request. The search was conducted in Classes 23/270 and 210/265,268. The closest prior art found appears to be the Binswanger U.S. Pat. No. 2,743,999.

The process described herein has numerous applications. It can be used to prepare calcium fluoride, magnesium fluoride, aluminum fluoride and other water-insoluble salts. The solid reactant and product are insoluble in the liquid reactant and are heavier than the liquid reactant. Another very prominent application for the process described herein is in the use of ion exchange resins to deplete a liquid solution of particular ions.

With respect to the application of my invention to ion exchange practice, ion exchange resins have important applications in water conditioning, chemical synthesis, medical research, food processing, mining, agriculture and a variety of other areas. These resins are classified into five categories relating to the type of functional group it has: strong acid, weak acid, strong base, weak base and a miscellaneous group of ion-specific structures. These resins are well known. In water conditioning, the resins are used in softening and decolorization. With few exceptions, the great utility of ion exchange resins rests with ability for its re-use. For instance, the following takes place in a water softening process:

$$2R\,Na+ + Ca++ \rightarrow R_2Ca++ + 2Na+$$

The ion exchange resin R in sodium form is able to exchange for calcium and thus remove calcium from hard water replacing it with an equivalent quantity of sodium. Subsequently, the calcium-loaded resin may be regenerated with a sodium chloride solution converting it again to the sodium form. Millions of gallons of water can be softened per cubic foot of resin during an operating period which can span many years.

In the practice of my invention, the ion exchange resin in particulate form is passed countercurrently to the solution which is to be depleted of certain ions. The treated solution is recovered at one end of the system whereas the ion exchange resin is recovered at the other end of the system. Upon regeneration of the spent resin, it is ready for re-use. In this sense, the spent resin constitutes the solid product referred to previously.

In the production of calcium fluoride, a fluorine compound, such as ammonium fluoride or hydrofluoric acid, is reacted with a calcium compound, such as limestone. Ammonium fluoride solution may be obtained from a flo 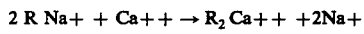 stream of ammonium silicofluoride and ammonium bisilicofluoride which is reacted in an ammoniator at an alkaline pH by addition of an ammonia source to precipitate silica leaving ammonium fluoride solution behind after extraction of silica. The ammonium fluoride solution is then pumped to a spar reactor where it is reacted with a calcium source, such as calcium carbonate, to produce spar, calcium fluoride. The ammonium silicofluoride and ammonium bisilicofluoride solution is normally at a pH of 3.2 to 4.5 and is used to absorb fluorine compounds from vapors emanating from wet process phosphoric acid plant. These vapors contain essentially hydrogen fluoride, silicon tetrafluoride and water vapor. The fluorine vapors must be removed in order to prevent contamination of the atmosphere.

In the production of wet process phosphoric acid, unground phosphate rock is passed through a ball mill where it is reduced to a particulate form. Ground phosphate rock and sulfuric acid are added to an attack tank where a slurry is formed and where sulfuric acid reacts with the phosphate rock to form dilute phosphoric acid. The slurry is pumped to a flash cooler operating under reduced pressure where water and other gases containing fluorine compounds, mainly hydrogen fluoride and silicon tetrafluoride, are flashed and then condensed in a barometric condenser. The slurry from the flash cooler, which is about 30% $P_2O_5$, is returned to the attack tank from where it is pumped to a filter where it is subjected to washing and gypsum separation.

The gases from the flash cooler entering the barometric condenser, which also operates under reduced pressure, are condensed with an ammonium silicofluoride and ammonium bisilicofluoride solution at pH of 3.8 to 4.5 and collected in the barometric leg to a height which can be supported by the atmospheric pressure acting on an open hot well in which the barometric leg is immersed. When the certain height of the solution in the barometric condenser is exceeded, the excess solution empties into the hot well.

The filtrate from the gypsum filter is essentially 28 to 32% $P_2O_5$ phosphoric acid. This weak phosphoric acid is pumped to evaporators where the acid is upgraded serially to about 54% $P_2O_5$ phosphoric acid. Each of the evaporators is provided with a barometric condenser which draws the vapors from the associated evaporator by means of reduced pressure imposed by recycled liquor and sometimes supplemented with a steam ejector attached to the barometric condenser. The vapors in the barometric condensers are condensed by a recirculating solution which is composed essentially of ammonium silicofluoride and ammonium bisilicofluoride and in this manner, hydrogen fluoride and silicon tetrafluoride are absorbed.

Silica is precipitated in an ammoniator where pH of a bleed stream from the recirculating solution is raised to a range from 8 to 10.5 by addition to the solution in the ammoniator an ammonia source. Upon separation, silica is recovered as a product and the ammonium fluoride solution is divided into two streams: one going to the recirculating circuit and the other, which is about two thirds of the entire stream, is pumped to a spar reactor for processing into calcium fluoride by reacting it with a calcium source.

The invention described herein, therefore, relates to utilization of ammonium fluoride solution from the ammoniator. The invention will be illustrated by specific reference to the reaction between ammonium fluoride with calcium carbonate although it should be understood that this is merely examplary of a more general innovation.

Apparatus which is used to carry out the process described herein includes vessels 10, 12 and 14 with a connecting conduit 16 between vessels 10 and 12 and another connecting conduit 18 between vessels 12 and 14. In an experimental unit, vessels are about six feet in height and about 14 inches in internal diameter. The connecting conduits have internal diameter of about 2 inches. Vessel 10 is somewhat taller than the other two in order to accomodate foaming. During steady state operation, each vessel has slurry layer 20, 22, and 24 in the lower part of the vessel and a clear liquid layer 26, 28 and 30 directly above the slurry layer. The slurry layer has a solids concentration of about 50 to 65% on weight basis. There is a visually recognizable interface 32, 34, and 36 between the slurry layer and the clear liquid layer in the respective vessels and an interface 38, 40 and 42 between the clear liquid layer and the vapor space above.

Dip leg 44 extends from above vessel 10 and into the slurry layer. Since there is considerable foaming during operation of the process, the dip leg is used to introduce calcium carbonate or another calcium source into vessel 10 without having it removed with the clear solution. Pumps 46, 48, and 50, coupled to respective vessels, recirculate the clear solution from the top to the bottom of each vessel by means of respective lines 45, 47, and 49. Since only the clear liquid is recycled by the pumps, the solid particles are not transported past fast moving impellers of the pumps and are therefore, not pulverized to fine particles which would form slimes. Presence of the slimes would make filterability of the calcium fluoride product much more difficult since the product particles would be much smaller. Furthermore, if the impellers were allowed to pulverize the solid particles and create slimes, this would adversely affect and possibly eliminate the sharp interface between the slurry and the clear liquid.

A portion of the clear liquid is continually withdrawn from vessel 10 by means of line 52. A portion of the slurry is continually withdrawn from vessel 14 and allowed to settle in settling tank 54. A solid particulate product is removed from tank 54 through line 56 and the remaining liquid is recirculated to the top of vessel 14 via line 57, pump 58, line 60 and line 62. The off-gases are withdrawn from the top of each vessel by lines 64, 66 and 68 which feed into the main line 70. Each vessel is provided with perforated plates 72, 74, and 76 at the bottom portion thereof with the slurry layer to uniformly distribute the recirculating clear liquid. The pressure drop across the perforated plate in the embodiment described herein is about 10 inches of water.

The process is initiated by filling each vessel to about the level of the interface between clear liquid and vapor phase with water or ammonium fluoride ($NH_4F$) solution. A dry solid particulate material, such as oolite limestone, which is typically 14 × 100 mesh and preferably 20 × 65 mesh, is fed continually into vessel 10 via dip leg 44 at the rate of about 30 pounds per hour. Limestone is preferably added with enough water or ammonium fluoride solution to wash it down into vessel 10 through dip leg 44. The limestone had the following analysis:

| | |
|---|---|
| F | 0.1% |
| $P_2O_5$ | 0.0 |
| $NH_4$ | 0.0 |
| Si | 0.0 |
| Ca | 38.0 |
| $H_2O$ | 2.2 |
| $CO_2$ | 43.0 |

At the same time, ammonium fluoride solution at pH of 9, containing 7 to 9% fluorine, is fed continuously to vessel 14 at about 140 pounds per hour. The ammonium fluoride solution should contain a minimum of about 4% and a maximum of about 12% fluorine. Analysis of the ammonium fluoride ($NH_4F$) solution was as follows:

| | |
|---|---|
| F | 8.1% |
| $P_2O_5$ | 0.1 |
| $NH_4$ | 6.3 |
| Si | 0.0 |
| Ca | 0.0 |
| $CO_2$ | 0.1 |

Pumps 46, 48, and 50 are started and clear liquid is decanted in each vessel from the point near the clear liquid-vapor interface 38, 40 and 42 down into each pump and upward at some velocity into each vessel through perforated plates 72, 74, and 76. The recycle stream in the system illustrated by the drawing is about 8 to 10 gallons per minute. As was already mentioned, the upward flow of the clear liquid into each vessel is made uniform over the cross-sectional area of the vessel by the perforated plates installed just inside the bottom of each vessel.

As the particulate limestone is added to vessel 10, each particle falls toward the bottom meeting at some point the upward flow of the recirculating clear liquid. As each particle descends, it is forced into random motion by a number of forces, including gravitational pull downwards, upward momentum of the recirculating solution, viscosity differentials and turbulence. Since the upflowing liquid velocity is held uniform across the vessel by the perforated plate, the slurry and clear-liquid interface level may be lifted or lowered by merely opening-up or throttling-down the valves on each pump discharge. For instance, if the throttle valve on the pump is closed completely, there would be no upward fluid force on the particulate limestone in that vessel and it would settle to the perforated plate. Conversely, if the valve is opened wide and the pump is designed to provide excess velocity, the slurry level will move up to the liquid-gas interface, and there will be no clear liquid layer for decanting.

At the start of a run, it is necessary to set the throttle valves on each pump so that the interface between the slurry and the clear liquid is lifted above solids transfer connections 16 and 18 between vessels 10, 12 and 14. The clear liquid layer disposed above the slurry must also be controlled so that it is deep enough to extend at least twice the diameter of respective outlet lines 45, 47, and 49 above and below the center line of the opening in each vessel to which respective lines 45, 47, and 49 are coupled. Flow tests in a transparent laboratory model vessel have demonstrated that it is possible without much difficulty to maintain approximately a 26-inch slurry layer and a 15-inch clear liquid layer above the slurry. The tests on the laboratory model of the vessel have also demonstrated that there is considerable latitude for varying the depth of respective layers without adverse affect on the process.

As had already been described, there is a solids transfer conduit 16 between vessels 10 and 12 and another one, 18, between vessels 12 and 14. These conduits can be horizontal or inclined downwardly from left to right. Particulate limestone added to vessel 10 moves freely to vessel 12 and then to vessel 14 through these conduits. Conduits 16 and 18 should be at approximately the slurry-clear liquid interface to permit movement of the solids just described. The net movement of the ammonium fluoride solution, however, is from vessel 14 to vessel 12 and then to vessel 10, or countercurrently to the flow of the solids.

The reaction taking place in the process described herein is between limestone and ammonium fluoride at a temperature of about 180° to 210° F, preferably about 200° F, and proceeds according to the following simplified chemical equation:

$$2NH_4F + CaCO_3 \rightarrow CaF_2 + 2NH_3 + CO_2 + H_2O$$

Ammonia and carbon dioxide leave the reaction system either in gaseous form or dissolved in the liquid. Each insoluble particle or limestone is replaced by an insoluble particle of 95% + calcium fluoride. On the basis of the tests made, reactant limestone and the product calcium fluoride behave in the fluidized suspension as if they were identical materials although for each 100 parts by weight of limestone only 78 parts of calcium fluoride is formed. This difference in mass is insufficient to affect fluidizing character of the slurry.

To balance the liquid system, clear ammonia-bearing solution at pH of about 9, from which part or all of the fluorine has been removed, is continuously decanted from vessel 10 through line 52 at approximately the same volumetric rate that ammonium fluoride solution is added to vessel 14. This solution is nearly free of solids and can be recycled to the fluorine recovery system for recovery of ammonia values. Analysis of this clear solution is as follows:

| | |
|---|---|
| F | 0.2% |
| $P_2O_5$ | 0.2 |
| $NH_4$ | 3.2 |
| Si | 0.0 |
| Ca | 0.0 |
| $CO_2$ | 2.7 |

Addition of limestone to vessel 10 is continued without removal of calcium fluoride product from vessel 14 until concentration of solids by weight in the slurry is approximately 50 to 30% in vessel 10, 45 to 25% in vessel 12 and 40 to 20% in vessel 14. Product slurry is removed from vessel 14, settled in settling tank 54, the product removed via line 56 and the supernatent liquid containing appreciable ammonium fluoride reactant is pumped to vessel 14. Easily filterable calcium fluoride product is recovered at about 25 pounds per hour. Analysis of the product is given below for runs made at temperatures of 190° and 200° F in the spar reactor.

| | 190° F | 200° F |
|---|---|---|
| F | 46.3% | 47.9% |
| $P_2O_5$ | 0.2 | 0.3 |
| $NH_4$ | 0.2 | 0.2 |
| Si | 0.1 | 0.2 |
| Ca | 47.5 | 50.8 |
| $CO_2$ | 0.1 | 0.0 |

The supernatent liquid is returned to vessel 14 for recovery of ammonia values. This liquid had the following analysis:

| | |
|---|---|
| F | 4.1 |
| $P_2O_5$ | 0.0 |
| $NH_4$ | 5.2 |
| Si | 0.0 |
| Ca | 0.0 |
| $CO_2$ | 1.0 |

The process described herein can be operated continuously with resultant savings in labor and capital costs per unit of product when compared with a batch process. Temperature in each vessel can be readily controlled by installing heat exchangers in loops around each pump. Because of the unique layering effect which takes place between the slurry and the clear liquid, it is possible to move the liquid and the particulate solids counter-currently to each other and thus achieve the high conversions which typify a counter-current system. Although two reactors can be used instead of the three disclosed herein, percentage of conversion can be increased by adding additional reactors and operating them in series, as disclosed.

I claim:

1. A process for producing a solid product, which is insoluble in and heavier than liquid reactant, by passing a solid particulate reactant, which is insoluble in and heavier than the liquid reactant, counter-currently to the liquid reactant comprising adding the solid reactant to a first zone, adding the liquid reactant to a second zone, passing the liquid reactant from the second zone to the first zone through a conduit established between the zones while simultaneously counter-currently passing the solid reactant from the first zone to the second zone through the same conduit, establishing a slurry layer of liquid and solid particles in each zone extending from the bottom of the zone to a level above the conduit, establishing a clear liquid layer in each zone above the slurry layer which is defined by a visually recognizable interface between the slurry layer and the clear liquid layer, recirculating the clear liquid to the bottom portion of each zone in order to maintain the interface at the desired level and to maintain the particulate solid reactant in a turbulent state, withdrawing the clear liquid from the first zone at about the rate of adding the liquid reactant to the second zone and withdrawing the slurry containing the solid product from the second zone at a rate to allow maintenance of steady state conditions.

2. Process of claim 1 including the step of separating the solid product from the slurry withdrawn from the second zone and recycling the liquid to one of the zones.

3. Process of claim 1 further including the step of uniformly distributing the flow of the recirculating clear liquid across the cross-sectional area of each zone.

4. Process of claim 3 wherein the solid product is a fluoride salt and the liquid reactant is alkaline ammonium fluoride solution.

5. Process of claim 3 wherein the solid product is calcium fluoride and the liquid reactant is selected from hydrofluoric acid, alkaline ammonium fluoride solution and mixtures thereof.

6. Process of claim 5 wherein pH of the ammonium fluoride solution is from about 8 to 10.5 and the ammonium fluoride solution contains from about 4 to 12% fluorine, the process including the step of maintaining the temperature of the clear liquid and slurry in each of the zones at about 180° to 210° F.

7. Process of claim 3 wherein the solid reactant is an ion exchange resin in a particulate form and the liquid reactant is a solution containing ions which are to be removed upon contact with the resin.

8. Process of claim 3 including the steps of passing the liquid from the second zone to an intermediate zone through a conduit between the intermediate zone and the second zone and then to the first zone and, likewise, passing the particulate solids from the first zone to the intermediate zone through a conduit between the first zone and the intermediate zone and then to the second zone, establishing a slurry layer of liquid and solid particles in the intermediate zone extending from the bottom of the zone to a level above the two conduits connecting the intermediate zone to the other two zones, establishing a clear liquid layer in the intermediate zone above the slurry layer which is defined by a visually recognizable interface between the slurry layer and the clear liquid layer and recycling the clear liquid in the intermediate zone to the bottom portion of said zone to maintain the interface at the desired level and to maintain the particulate solid reactant in a turbulent state.

9. Process of claim 8 wherein the solid product is a fluoride salt and the liquid reactant is alkaline ammonium fluoride solution.

10. Process of claim 9 wherein pH of the ammonium fluoride solution is about 8 to 10.5 and the ammonium fluoride solution contains from about 4 to 12% fluorine, the process including the step of maintaining the temperature of the clear layer liquid and slurry in each zone at about 180° to 210° F.

11. Process of claim 8 wherein the solid reactant is an ion exchange resin in a particulate form and the liquid reactant is a solution containing ions which are to be removed upon contact with the resin.

12. Process of claim 3 including the step of maintaining concentration of solids on weight basis in the slurry at about 50 to 30% in the first zone and about 40 to 20% in the second zone.

13. Process of claim 8 including the step of maintaining concentration of solids on weight basis in the slurry at about 50 to 30% in the first zone, about 45 to 25% in the intermediate zone and about 40 to 20% in the second zone.

* * * * *